United States Patent
Gao et al.

(10) Patent No.: US 11,958,476 B2
(45) Date of Patent: Apr. 16, 2024

(54) INTELLIGENT PARKING METHOD AND APPARATUS

(71) Applicant: GREAT WALL MOTOR COMPANY LIMITED, Baoding (CN)

(72) Inventors: Tong Gao, Baoding (CN); Teng Guo, Baoding (CN); Xingyu Qi, Baoding (CN); Peng Hao, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 100 days.

(21) Appl. No.: 17/765,164

(22) PCT Filed: Nov. 27, 2020

(86) PCT No.: PCT/CN2020/132383
§ 371 (c)(1),
(2) Date: Mar. 30, 2022

(87) PCT Pub. No.: WO2021/104475
PCT Pub. Date: Jun. 3, 2021

(65) Prior Publication Data
US 2022/0340126 A1      Oct. 27, 2022

(30) Foreign Application Priority Data
Nov. 29, 2019   (CN) .......................... 201911206097.0

(51) Int. Cl.
*H04N 5/44* (2011.01)
*B60W 30/06* (2006.01)
(Continued)

(52) U.S. Cl.
CPC .......... *B60W 30/06* (2013.01); *B60W 40/105* (2013.01); *B60W 50/14* (2013.01);
(Continued)

(58) Field of Classification Search
CPC .... B60W 30/06; B60W 40/105; B60W 50/14; B60W 2050/0005; B60W 2050/146; B60W 2420/42; G06V 20/586
See application file for complete search history.

(56) References Cited

U.S. PATENT DOCUMENTS

| | | | |
|---|---|---|---|
| 2009/0030607 A1* | 1/2009 | Sakata ............... | G01C 21/3685 701/533 |
| 2012/0253655 A1* | 10/2012 | Yamada .................. | B60L 58/12 340/870.07 |

(Continued)

FOREIGN PATENT DOCUMENTS

| | | |
|---|---|---|
| CN | 102933442 | 2/2013 |
| CN | 104015724 | 9/2014 |

(Continued)

OTHER PUBLICATIONS

International Search Report for Application No. PCT/CN2020/132383, dated Feb. 25, 2021, (13 pages).

(Continued)

*Primary Examiner* — Munear T Akki
(74) *Attorney, Agent, or Firm* — NIXON PEABODY LLP; Jeffrey L. Costellia

(57) ABSTRACT

Provided are an intelligent parking method and apparatus, relating to the technical field of vehicles. The method comprises: determining a target parking route from at least one pre-stored parking route; determining a target position point in the target parking route closest to a vehicle; sending a prompt message for driving the vehicle to the target position point to a driver of the vehicle when a current position point of the vehicle and the target position point satisfy a proximity matching condition; and when the vehicle drives to the target position point, controlling the vehicle to park according to the target parking route from the target position point. Thus, the driver merely needs to drive (Continued)

the vehicle to a vicinity of the target parking route, and the vehicle may perform intelligent parking and may complete intelligent parking at a longer distance.

13 Claims, 7 Drawing Sheets

(51) Int. Cl.
  *B60W 40/105* (2012.01)
  *B60W 50/14* (2020.01)
  *G06V 20/58* (2022.01)
  *B60W 50/00* (2006.01)

(52) U.S. Cl.
  CPC ... *G06V 20/586* (2022.01); *B60W 2050/0005* (2013.01); *B60W 2050/146* (2013.01); *B60W 2420/42* (2013.01); *B60W 2520/06* (2013.01)

(56) References Cited

U.S. PATENT DOCUMENTS

| | | | |
|---|---|---|---|
| 2013/0085637 A1* | 4/2013 | Grimm | B62D 15/0285 701/25 |
| 2013/0138345 A1* | 5/2013 | Sakaguchi | G01C 21/3626 701/533 |
| 2014/0176348 A1* | 6/2014 | Acker, Jr. | G08G 1/04 340/932.2 |
| 2016/0110619 A1 | 4/2016 | Kim et al. | |
| 2016/0155331 A1 | 6/2016 | Mielenz | |
| 2018/0093664 A1 | 4/2018 | Kim et al. | |
| 2018/0194344 A1* | 7/2018 | Wang | G05D 1/0088 |
| 2018/0265130 A1 | 9/2018 | Derendarz et al. | |
| 2019/0256144 A1* | 8/2019 | Yamada | B62D 15/0285 |
| 2020/0346639 A1* | 11/2020 | Tashiro | B60W 50/14 |

FOREIGN PATENT DOCUMENTS

| | | |
|---|---|---|
| CN | 104627175 | 5/2015 |
| CN | 105752080 | 7/2016 |
| CN | 105966395 | 9/2016 |
| CN | 108437981 | 8/2018 |
| CN | 109278742 | 1/2019 |
| CN | 109466546 | 3/2019 |
| CN | 109649383 | 4/2019 |
| CN | 109866761 | 6/2019 |
| CN | 109937169 | 6/2019 |
| CN | 110088803 | 8/2019 |
| CN | 110091866 | 8/2019 |
| CN | 110126817 A | 8/2019 |
| CN | 110329245 | 10/2019 |
| CN | 111976717 | 11/2020 |
| DE | 102017124661 | 4/2019 |
| EP | 1 500 950 | 12/2014 |
| EP | 4091912 | 11/2022 |
| JP | 2013-530867 | 8/2013 |
| JP | 2018-508082 | 3/2018 |
| WO | WO-2019/181264 | 9/2019 |
| WO | WO-2021/195951 | 10/2021 |

OTHER PUBLICATIONS

Chinese Notice Search Report for Application No. 201911206097.0, dated Jun. 1, 2021, (13 pages).
Chinese Office Action for Application No. 201911206097.0, dated Sep. 22, 2021 (8 pages).
Supplemental European Search Report for App. No. 20894561.8, dated May 9, 2023, (11 pages).
Japanese Office Action for App. No. 2022-520404, dated Mar. 14, 2023, (6 pages).
India Office Action for Application No. 202227018935, dated Sep. 9, 2022 (6 pages).
Korean Office Action for App. No. 10-2022-7010728, mailed Jan. 22, 2024 (10 pages).

* cited by examiner

INTELLIGENT PARKING METHOD AND APPARATUS

The present application claims the priority of the Chinese patent application filed on Nov. 29, 2019 before the Chinese Patent Office with the application number of 201911206097.0 and the title of "INTELLIGENT PARKING METHOD AND APPARATUS", which is incorporated herein in its entirety by reference.

TECHNICAL FIELD

The present disclosure relates to the technical field of vehicles, and more particularly, to an intelligent parking method and apparatus.

BACKGROUND

With the rise of vehicle technologies, autonomous driving technologies have attracted more and more attention. The automatic driving technologies comprise such a function of automatic parking.

At present, a realization process of the automatic parking function is as follows: a driver drives a vehicle to a position which is in front of and proximate to a parking slot, then manually enables the automatic parking function, and then the vehicle automatically reverses into the parking slot to complete automatic parking. However, as the control distance of automatic parking is very short, the workload for the driver to realize automatic parking is heavy, the driving duration is relatively long, and the convenience of parking is low.

SUMMARY

In view of this, the present disclosure aims to propose an intelligent parking method and apparatus to solve the problems in the prior art that the workload for the driver to realize automatic parking is heavy, the driving duration is long, and the convenience of parking is low due to the short control distance of automatic parking.

To achieve the above objects, the technical solutions of the present disclosure are implemented as follows:

In a first aspect, an intelligent parking method applied to a vehicle is provided, comprising:
  determining a target parking route from at least one pre-stored parking route;
  determining a target parking route from at least one pre-stored parking route;
  sending a prompt message for driving the vehicle to the target position point to a driver of the vehicle when a current position point of the vehicle and the target position point satisfy a proximity matching condition; and
  when the vehicle drives to the target position point, controlling the vehicle to park according to the target parking route from the target position point.

Further, before the step of determining the target position point from the at least one pre-stored parking route, the method further comprises:
  shooting a plurality of driving images when receiving a route learning instruction;
  determining moving tracks of at least one feature object in a driving environment in the plurality of driving images respectively;
  determining the target parking route according to each moving track; and
  storing the target parking route.

Further, the step of sending the prompt message for driving the vehicle to the target position point to the driver of the vehicle when the current position point of the vehicle and the target position point satisfy the proximity matching condition comprises:
  determining an actual distance between the current position point of the vehicle and the target position point;
  determining a first distance that the actual distance is projected to a first direction, the first direction being a tangent direction of the target parking route at the target position point;
  determining a second distance that the actual distance is projected to a second direction, the second direction being perpendicular to the first direction;
  determining a heading angle between a current driving direction of the vehicle and the first direction; and
  when at least one of the first distance being less than or equal to a first preset value, the second distance being less than or equal to a second preset value, and the heading angle being less than or equal to a third preset value is satisfied, sending a prompt message for driving the vehicle to the target position point to the driver of the vehicle.

Further, before the step of, when the vehicle drives to the target position point, controlling the vehicle to park according to the target parking route from the target position point, the method further comprises:
  outputting a prompt message for indicating to brake at the target position point; and
  the step of, when the vehicle drives to the target position point, controlling the vehicle to park according to the target parking route from the target position point, comprises:
  when the vehicle drives to the target position point and a vehicle speed is detected to be zero, controlling the vehicle to park according to the target parking route from the target position point.

Further, the step of determining the target position point in the target parking route closest to the vehicle comprises:
  detecting a vehicle parameter, the vehicle parameter comprising at least one of a tire pressure, a door state and a rearview mirror state; and
  when the vehicle parameter satisfies a preset condition, determining the target position point in the target parking route closest to the vehicle.

Compared with the prior art, the intelligent parking method according to the present disclosure has the following advantages:

In the embodiment of the present disclosure, the vehicle receives a parking instruction, in response to the parking instruction, determines the target parking route from the at least one pre-stored parking route and determines the target position point closest to the vehicle in the target parking route; when the current position point of the vehicle and the target position point satisfy the proximity matching condition, that is, when the vehicle is in a vicinity of the target parking route, controls the vehicle to drive to the target position point, and controls the vehicle to park according to the target parking route from the target position point. Thus, the driver merely needs to drive the vehicle to the vicinity of the target parking route, and the vehicle may perform intelligent parking. In the embodiment of the present disclosure, the vehicle may complete intelligent parking at a longer distance, without driving the vehicle to a position in front of a parking slot and immediately adjacent to the parking slot for automatic parking, thereby saving the workload and the driving duration of the driver for achieving automatic parking, and improving the convenience of parking.

Another object of the present disclosure aims at providing an intelligent parking apparatus, comprising:
a first processor configured for determining a target parking route from at least one pre-stored parking route;
a second processor configured for determining a target position point in the target parking route closest to a vehicle;
a message sender configured for sending a prompt message for driving the vehicle to the target position point to a driver of the vehicle when a current position point of the vehicle and the target position point satisfy a proximity matching condition; and
a controller configured for, when the vehicle drives to the target position point, controlling the vehicle to park according to the target parking route from the target position point.

Further, the apparatus further comprises:
a photo capturer configured for shooting a plurality of driving images when receiving a route learning instruction;
a third processor configured for determining moving tracks of at least one feature object in a driving environment in the plurality of driving images, respectively;
a fourth processor configured for determining the target parking route according to each moving track; and
a storage processor configured for storing the target parking route.

Further, the message sender comprises:
a first determining sub-processor configured for determining an actual distance between the current position point of the vehicle and the target position point;
a second determining sub-processor configured for determining a first distance that the actual distance is projected to a first direction, the first direction being a tangent direction of the target parking route at the target position point;
a third determining sub-processor configured for determining a second distance that the actual distance is projected to a second direction, the second direction being perpendicular to the first direction;
a fourth determining sub-processor configured for determining a heading angle between a current driving direction of the vehicle and the first direction; and
a message sub-sender configured for, when at least one of the first distance being less than or equal to a first preset value, the second distance being less than or equal to a second preset value, and the heading angle being less than or equal to a third preset value is satisfied, sending a prompt message for driving the vehicle to the target position point to the driver of the vehicle.

Further, the apparatus further comprises:
an output processor configured for outputting a prompt message for indicating to brake at the target position point; and
the controller comprises:
a first sub-controller configured for, when the vehicle drives to the target position point and a vehicle speed is detected to be zero, controlling the vehicle to park according to the target parking route from the target position point.

Further, the second processor comprises:
a detecting sub-processor configured for detecting a vehicle parameter, the vehicle parameter comprising at least one of a tire pressure, a door state and a rearview mirror state; and
a fifth determining sub-processor configured for, when the vehicle parameter satisfies a preset condition, determining the target position point in the target parking route closest to the vehicle.

The intelligent parking apparatus has the same advantages as that of the above-mentioned intelligent parking method relative to the prior art, which will not be elaborated herein.

The above description is merely a summary of the technical solutions of the present disclosure. In order to more clearly know the technical means of the present disclosure to enable the implementation according to the contents of the description, and in order to make the above and other objects, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the drawings that are required to describe the embodiments or the prior art will be briefly introduced below. Apparently, the drawings that are described below are embodiments of the present disclosure, and a person skilled in the art may obtain other drawings according to these drawings without paying creative work.

Drawings constituting a part of the present disclosure here serve to provide a further understanding of the present disclosure, and the illustrative embodiments of the present disclosure and together with the description thereof serve to explain the present disclosure, and do not constitute inappropriate restriction to the present disclosure. In the drawings.

DETAILED DESCRIPTION OF THE EMBODIMENTS

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should be noted that, in case of no conflict, the embodiments in the present disclosure and the features in the embodiments may be combined with each other.

The present disclosure will be explained in detail with reference to the accompanying drawings and embodiments hereinafter.

First Embodiment

Figure 1:
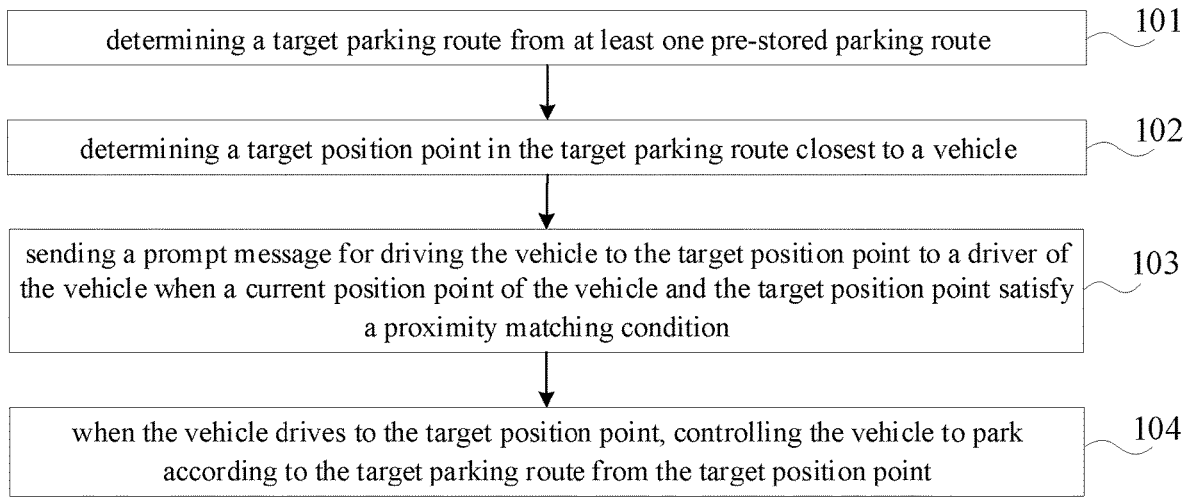
FIG. 1 shows a flow chart of an intelligent parking method provided by a first embodiment of the present disclosure.

FIG. 1 shows a flow chart of an intelligent parking method provided by the first embodiment of the present disclosure. The intelligent parking method is applied to a vehicle, as shown in FIG. 1, the method includes:

Step 101: determining a target parking route from at least one pre-stored parking route.

In the embodiment of the present disclosure, the vehicle may display an intelligent parking interface, and a user may select an intelligent parking option in the intelligent parking interface to trigger a parking instruction. At least one parking route is pre-stored in the vehicle. After receiving the parking instruction, the vehicle may determine the target parking route from the pre-stored parking route. The target parking route may be selected by the user from the intelligent parking interface, or may be obtained by the vehicle by means of automatically matching a closet parking route according to a current position of the vehicle.

Step 102: determining a target position point in the target parking route closest to a vehicle.

In the embodiment of the present disclosure, the vehicle may determine distance values from each position point in the target parking route to the vehicle, and the position point corresponding to the smallest distance value in the distance values is the target position point.

Step 103: sending a prompt message for driving the vehicle to the target position point to a driver of the vehicle when a current position point of the vehicle and the target position point satisfy a proximity matching condition.

In the embodiment of the present disclosure, the current position point of the vehicle and the target position point satisfy the proximity matching condition, which indicates that the vehicle is in a vicinity of the target parking route. In this case, the prompt message for driving the vehicle to the target position point is sent to the driver of the vehicle.

Step 104: when the vehicle is driven to the target position point, controlling the vehicle to park according to the target parking route from the target position point.

In the embodiment of the present disclosure, when the vehicle is driven to the target position point, the vehicle may automatically park according to the target parking route from the target position point until the vehicle is driven to an ending point of the target parking route, thus completing automatic parking.

In the embodiment of the present disclosure, the vehicle determines the target parking route from the at least one pre-stored parking route and determines the target position point closest to the vehicle in the target parking route; sends the prompt message of driving the vehicle to the target position point to the driver of the vehicle when the current position point of the vehicle and the target position point satisfy the proximity matching condition, that is, when the vehicle is in a vicinity of the target parking route, controls the vehicle to park according to the target parking route from the target position point when the vehicle is driven to the target position point. Thus, the driver merely needs to drive the vehicle to the vicinity of the target parking route, and the vehicle may perform intelligent parking. In the embodiment of the present disclosure, the vehicle may complete intelligent parking at a longer distance, without driving the vehicle to a position which is close to the front adjacent parking slot to perform automatic parking, thereby saving the workload and the driving duration of the driver for achieving automatic parking, and improving the convenience of parking.

Second Embodiment

Figure 2:
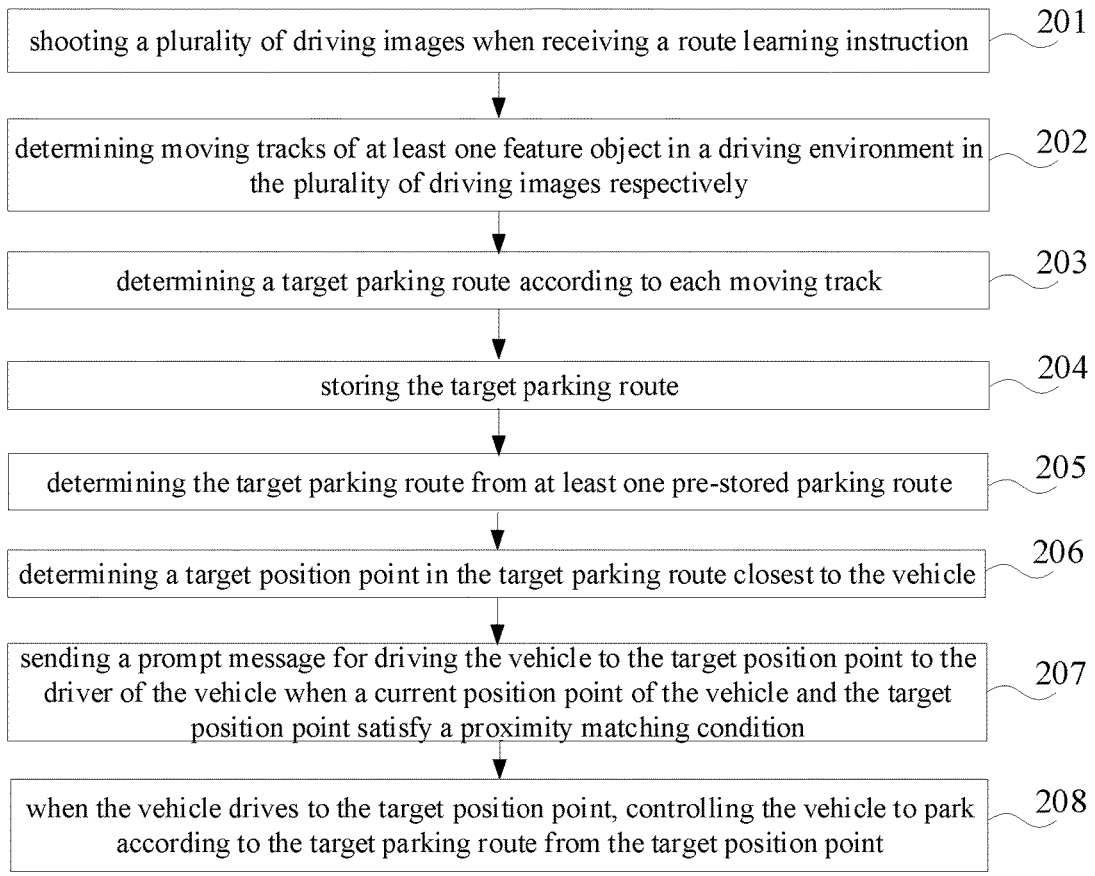
FIG. 2 shows a flow chart of an intelligent parking method provided by a second embodiment of the present disclosure.

FIG. 2 shows a flow chart of an intelligent parking method provided by the second embodiment of the present disclosure. The intelligent parking method is applied to a vehicle, as shown in FIG. 2, the method comprises:

Step 201: shooting a plurality of driving images when receiving a route learning instruction.

In the embodiment of the present disclosure, a user may click a "Route learning" option in an intelligent parking interface to trigger a route learning instruction. When the vehicle receives the route learning instruction, the vehicle will start an Around View Monitor (AVM) system thereof. The vehicle may shoot a plurality of driving images in a driving process through an ultrasonic radar and a panoramic camera in the AVM system. The driving image may include surrounding objects during the driving process, such as fixed parking signs, parking slot lines or fixed buildings.

Figure 3:
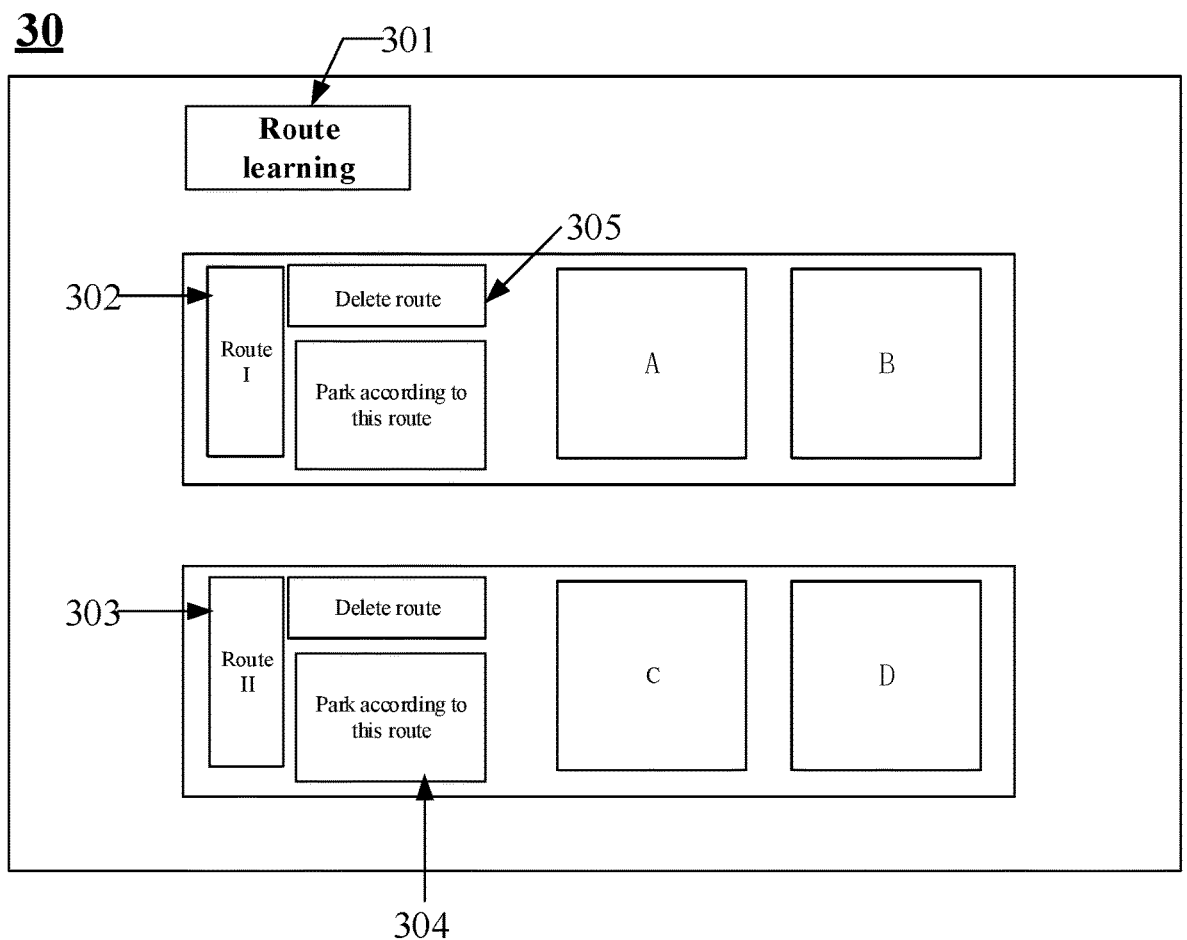
FIG. 3 shows an interface diagram of an intelligent parking interface provided by the second embodiment of the present disclosure.

For example, FIG. 3 shows an interface diagram of an intelligent parking interface provided by the second embodiment of the present disclosure. As shown in FIG. 3, the intelligent parking interface 30 includes the "Route learning" option 301. When the user clicks the "Route learning" option 301 in the intelligent parking interface 30, the vehicle may shoot a plurality of images during a driving process through the panoramic camera.

Figure 4:
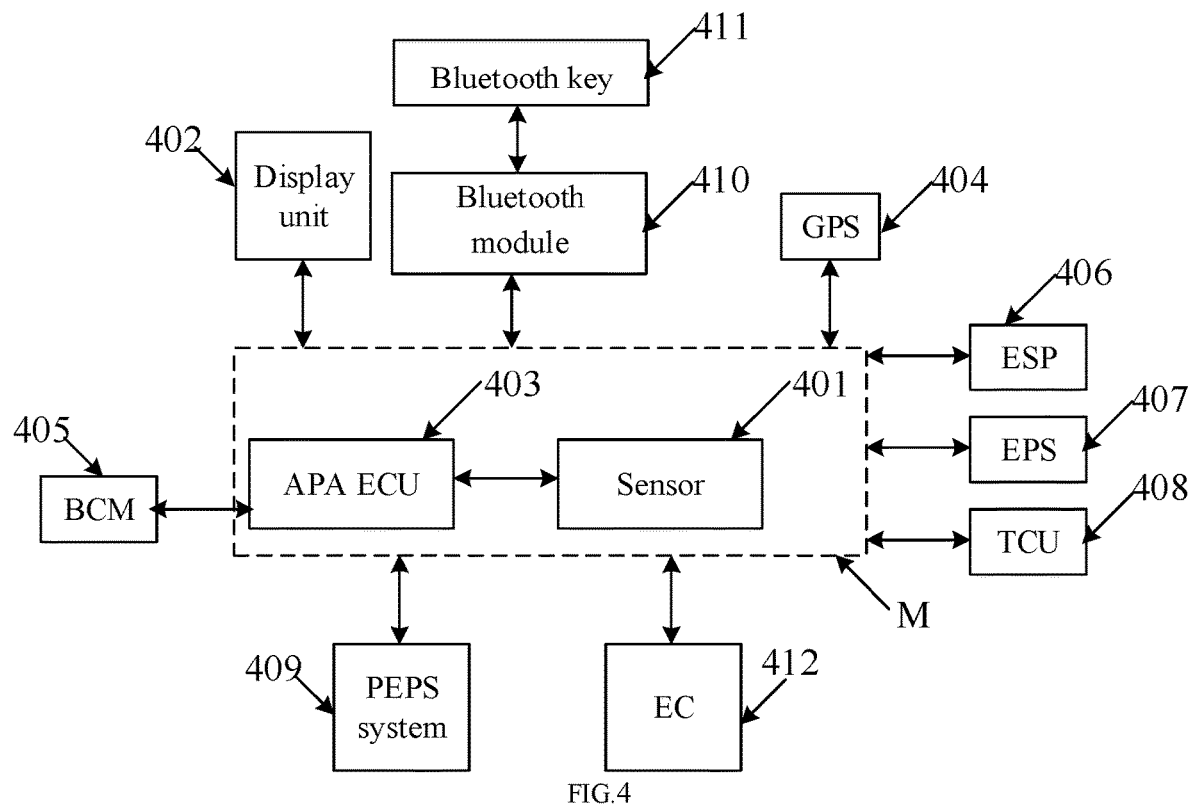
FIG. 4 shows a block diagram of a system of a vehicle provided by the second embodiment of the present disclosure.

Optionally, FIG. 4 shows a block diagram of a system of the vehicle provided by the second embodiment of the present disclosure, including: a sensor 401. The sensor 401 includes an ultrasonic sensor in an ultrasonic radar and an image sensor in a panoramic camera, and is mainly configured for collecting information about a surrounding environment of the vehicle. The vehicle may complete the step of shooting various driving images through the sensor 401.

Optionally, referring to FIG. 4, the system of the vehicle further includes a display unit 402. The display unit 402 may be configured for interface displaying, so the step of displaying the intelligent parking interface may be completed through the display unit 402.

Optionally, before step 201, the vehicle may also detect environmental parameters.

In the embodiment of the present disclosure, the environmental parameters include a learning environmental parameter and a parking environmental parameter, wherein the learning environmental parameter includes an illumination intensity of the environment, and the parking environmental parameter includes whether a surrounding scene is any one of an indoor parking slot, a crowded built community or a company, and the like.

In addition, the vehicle may get the parking environmental parameter by analyzing the images shot by the panoramic camera in the vehicle, and the vehicle may acquire the illumination intensity through an illumination sensor in the vehicle.

Then, when the environmental parameter satisfies a preset parking route environmental condition, step 201 is performed. When the environmental parameter does not satisfy the preset parking route environmental condition, fault information may be displayed on the intelligent display interface 30. The fault information may be that: the environment does not satisfy the route learning condition, and route learning cannot be performed.

In the embodiment of the present disclosure, the preset parking route environment condition includes the illumination intensity being greater than 800 Lux and the surrounding scene is any one of an indoor parking slot, a crowded built community or a company, and the like.

Moreover, on one aspect, when the illumination parameter is greater than 800 Lux, indicating that the illumination is sufficient, which makes brightness, contrast and other parameters of the plurality of driving images shot by the panoramic camera better, which is beneficial for the vehicle to perform image analysis and ensures the availability of the plurality of driving images. On the other aspect, when the surrounding scene is any one of an indoor parking slot, a crowded built community or a company, there are many objects with symbolic features in the surrounding scene, such as fixed parking signs, parking slot lines and the like, which is conducive to obtain moving tracks of more feature objects, and further conducive to accurately deduce a moving track of the vehicle according to the moving tracks of the plurality of feature objects, i.e., conducive to the accurate generation of the parking route.

Optionally, referring to FIG. 4, the system of the vehicle further includes: an Auto Parking Assist Electronic Control Unit (APA ECU) 403. The APA ECU 403 is connected with the sensor 401. The APA ECU 403 and the sensor 401 sever as a core system M. The APA ECU 403 is provided with an image recognition algorithm therein, which is configured to drive the sensor 401 and perform filtering and calculating to information of the images shot by the sensor 401, so as to obtain information of the surrounding environment of the vehicle after performing filtering and calculating. The environmental parameter may be detected through the APA ECU 403. The display unit 402 is connected with the core system M.

Optionally, when a man-made emergency operation is detected in the process of shooting the plurality of driving images in step 201, the shooting is first suspended. Then, when receiving a fault-solved instruction, the driver is prompted to return to a position where the shooting is suspended to trigger the vehicle to continue shooting.

For example, when the user puts the vehicle into a Parking (P) gear, the panoramic camera in the vehicle should stop shooting, and fault information may be displayed on the intelligent display interface 30. For example, the fault information may be that the route learning process is stopped as the user puts the vehicle into the P gear. When the user switches to a Drive (D) gear, that is, when the vehicle receives the fault-solved instruction, the driver is prompted to return to the position where the shooting is suspended to trigger the vehicle to continue shooting.

For another example, when the user avoids pedestrians urgently, a point of inflection point will appear in this case. The panoramic camera in the vehicle should stop shooting, and a fault information may be displayed on the intelligent display interface 30. For example, the fault information may be that the route learning process is suspended as the point of inflection appears in a driving route of the user. When the user switches to the Drive (D) gear, that is, when the vehicle receives the fault-solved instruction, the driver is prompted to return to the position where the shooting is suspended to trigger the vehicle to continue shooting.

In the embodiment of the present disclosure, when the vehicle drives to an ending position, the user may click a "Learning completed" option in a pop-up window that appears on the intelligent parking interface 30.

Step 202: determining moving tracks of at least one feature object in a driving environment in the plurality of driving images, respectively.

In the embodiment of the present disclosure, obvious objects and objects with constant positions in the driving environment may be regarded as feature objects, for example, both parking signs and parking slot lines in the driving environment may be regarded as feature objects. The vehicle may determine the moving tracks of the at least one feature object in the driving environment in the plurality of driving images by a simultaneous localization and mapping (SLAM) algorithm, respectively.

Specifically, the SLAM algorithm is mainly divided into two parts: a front end and a rear end, wherein the front end is a visual odometer (VO), which determines a movement situation of the panoramic camera according to adjacent driving images and provides an initial value for the rear end.

Wherein, the visual odometer identifies the feature point (feature object) from the plurality of driving images and matches the feature points in each of the driving images. The feature points of the driving images are composed of a key point and a descriptor. The key point refers to a position of the feature point in the driving image, and some key points also have at least one of direction and scale information. The descriptor is usually a vector that describes information of pixels around the key point in a preset way. Usually, the descriptor is designed according to the fact that feature points with similar appearance which should have similar descriptors. Therefore, when matching the feature points, as long as the descriptors of two feature points are close in vector space, the two feature points may be regarded as the same feature point, so a process of identifying, matching and obtaining the moving tracks may include:

Step 2021: searching pixels with feature points in the driving images, and extracting key points in the driving images.

Step 2022: calculating descriptors of the feature points according to position information of the key points.

Step 2023: matching descriptors of at least one feature point in the driving environment in the plurality of driving images, respectively, according to the descriptors of the feature points.

Step 2024: recording position information of the successfully matched descriptors, and connecting the position information according to a time sequence to obtain moving tracks of the at least one feature point in the plurality of driving images, respectively.

For example, take Oriented FAST and Rotated BRIEF (ORB) feature points as an example. The ORB feature points will not change with the movement and rotation of the camera or change of illumination. The key points in the driving images are quickly extracted by using a Features from Accelerated Segment Test (FAST) feature extraction algorithm. The key points are called FAST corner points, and the ORB feature points are described by BRIEF descriptors. The descriptors of the at least one feature point in the driving environment are matched in the plurality of driving images, respectively, the position information of the successfully matched descriptors is recorded, and the position information is connected according to the time sequence to obtain the moving tracks of the at least one ORB feature point in the plurality of driving images respectively.

Optionally, referring to FIG. 4, the vehicle may execute the above-mentioned step 202 by the APA ECU 403.

Step 203: determining a target parking route according to each moving track.

Optionally, step 203 may be implemented as follows: determining the target parking route of the vehicle by the SLAM algorithm according to each moving track.

In the embodiment of the present disclosure, the vehicle may, according to each moving track, optimize each moving track through the rear end of the SLAM algorithm firstly, and then map a distance relationship between each optimized moving track and the panoramic camera through the rear end of the SLAM algorithm, and finally determine the target parking route of the vehicle.

Optionally, referring to FIG. 4, the vehicle may execute the above-mentioned step 203 by the APA ECU 403.

Step 204: storing the target parking route.

In the embodiment of the present disclosure, the vehicle stores all the key points and descriptors corresponding to the feature points in the target parking route into a point cloud database of the map built by the SLAM algorithm, and stores a starting position photo and an ending position photo of the target parking route into the point cloud database.

Optionally, referring to FIG. 4, the vehicle may execute the above-mentioned step 204 by the APA ECU 403.

Step 205: determining the target parking route from at least one pre-stored parking route.

In the embodiment of the present disclosure, the above-mentioned step 205 may be implemented as follows:

Step 2051: displaying an intelligent parking interface, the intelligent parking interface includes a starting position photo and an ending position photo of each parking route.

In the embodiment of the present disclosure, the vehicle may display the intelligent parking interface. The intelligent parking interface includes the starting position photo and the ending position photo of each parking route, and the user may intuitively know which parking route each parking route corresponds to.

For example, referring to FIG. 3, the intelligent parking interface 30 comprises a "Route I" option 302 and a "Route II" option 303. The "Route I" option 302 includes a starting position photo A and an ending position photo B of this parking route, and the "Route II" option 303 includes a starting position photo C and an ending position photo D of this parking route.

Step 2052: receiving a parking instruction in the intelligent parking interface.

In the embodiment of the present disclosure, the intelligent parking interface includes a parking route playback option, and the user may select the parking route playback option to trigger the parking instruction.

Optionally, referring to FIG. 4, the vehicle may execute the above-mentioned step 206 by the APA ECU 403.

Step 2053: determining the target parking route from the at least one pre-stored parking route.

In the embodiment of the present disclosure, after the user selects the parking route playback option, the intelligent parking interface includes a "Park by this route" option corresponding to the starting position photo and the ending position photo of each parking route, and the user may click the corresponding "Park by this route" option according to the needed parking route, that is, determine the target parking route.

For example, referring to FIG. 3, the intelligent parking interface 30 includes a "Park by this route" option 304. The user may select a parking route through the starting position photo and the ending position photo of the parking route. After determining the selected parking route, the user may click the corresponding "Park by this route" option, and then the parking route is the target parking route.

For further example, referring to FIG. 3, the intelligent parking interface 30 further includes a "Delete route" option 305, and the user may click this option to delete the corresponding parking route.

Optionally, referring to FIG. 4, the vehicle may execute the above-mentioned step 205 by the display unit 402 and the APA ECU 403.

Optionally, when the position information in the target parking route is Global Positioning System (GPS) location information, so when the vehicle enables the GPS positioning function, and the vehicle drives to a vicinity of the GPS location information in the target parking route again, and the vehicle speed is lower than a preset vehicle speed, the target parking route may be successfully matched with the current vehicle automatically, and display a prompt message in the intelligent parking interface, wherein the prompt message may be that: there is a pre-stored driving route near you, please keep the current low speed and drive. The preset vehicle speed may be 20 KM/h, which is not limited by the embodiment of the present disclosure.

Optionally, referring to FIG. 4, the system of the vehicle include a GPS 404, which is configured to complete the GPS positioning of the vehicle. The GPS 404 is connected with the core system M, and the vehicle may perform the above-mentioned vehicle matching by GPS through the GPS 404.

Step 206: determining a target position point in the target parking route closest to the vehicle.

In the embodiment of the present disclosure, the above-mentioned step 206 may be implemented as follows:

Step 2061: detecting a vehicle parameter, the vehicle parameter includes at least one of a tire pressure, a door state and a rearview mirror state.

In the embodiment of the present disclosure, it is necessary to detect the vehicle parameter, which may improve the safety during driving, wherein the vehicle parameter may include the tire pressure, the door state, the rearview mirror state and a state of the panoramic camera.

Optionally, referring to FIG. 4, the system of the vehicle further includes: a Body Control Module Controller (BCM) 405. The BCM 405 is connected with the core system M. The BCM 405 is mainly configured to feedback the door state and control a state of a door lock. The door state may be detected by the BCM 405.

Step 2062: when the vehicle parameter satisfies a preset condition, determining the target position point in the target parking route closest to the vehicle.

In the embodiment of the present disclosure, the tire pressure should be less than or equal to 1.8 Pa, the door state should be closed, the rearview mirror should be unfolded, and an occluded part of the panoramic camera should be less than or equal to 30%. The embodiment of the present disclosure does not specifically limit a preset value of the tire pressure and a proportion of the occluded part of the panoramic camera.

In addition, the vehicle may determine the target position point closest to the vehicle in the target parking route through calculation and comparison. When there are a plurality of closet target position points, the unique closet target position point should be determined according to a current driving direction and environmental parameters of the vehicle.

Optionally, when the vehicle parameter does not satisfy the preset condition, fault information is output.

For example, when the tire pressure is greater than 1.8 Pa, the fault information may be: the tire pressure is too high and automatic parking cannot be continued. When the door state is open, the fault information may be: the door is open and automatic parking cannot be continued. When the rearview mirror is folded, the fault information may be: the rearview mirror is folded and automatic parking cannot be continued. When the occluded part of the panoramic camera is more than 30%, the fault information may be: the panoramic camera is occluded and automatic parking cannot be continued.

Optionally, referring to FIG. 4, the system of the vehicle further includes: an Electronic Stability Program (ESP) 406. The ESP 406 is connected with the core system M. The ESP 406 is mainly used for feeding back driving distance information of the vehicle and performing a steering wheel rotation operation. Then, the vehicle may determine the target position point closest to the vehicle in the target parking route through executing step 206 by the ESP 406.

Step 207: sending a prompt message for driving the vehicle to the target position point to the driver of the vehicle when a current position point of the vehicle and the target position point satisfy a proximity matching condition.

In the embodiment of the present disclosure, the above-mentioned step 207 may be implemented as follows:

Step 2071: determining an actual distance between the current position point of the vehicle and the target position point.

In the embodiment of the present disclosure, the actual distance may be: a length of a line segment of connecting the current position point of the vehicle with the target position point.

Figure 5:
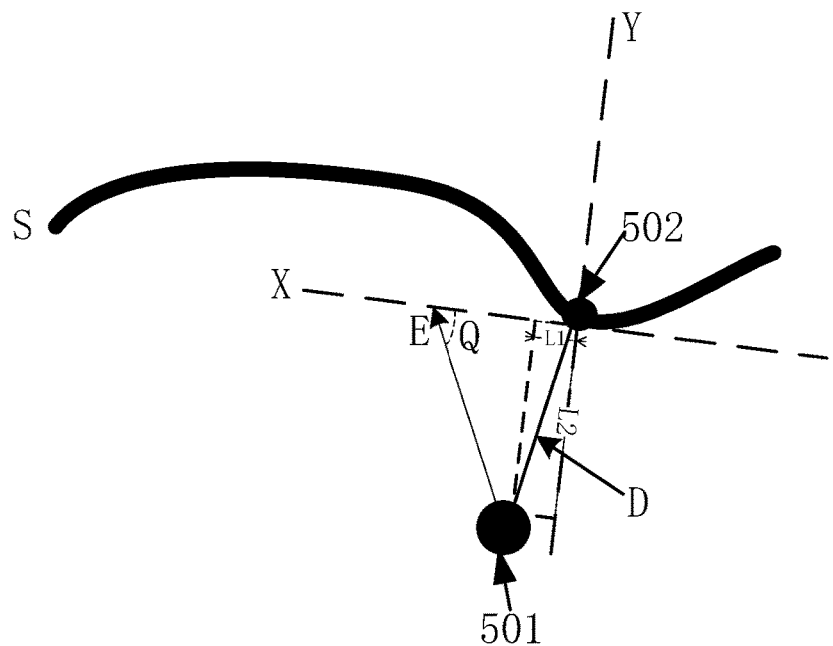
FIG. 5 shows a schematic scene diagram of a current position point and a target position point of the vehicle provided by the second embodiment of the present disclosure.

FIG. 5 shows a schematic scene diagram of the current position point and the target position point of the vehicle provided by the second embodiment of the present disclosure. The actual distance D between the current position point 501 of the vehicle and the target position point 502 is as shown in FIG. 5.

Optionally, referring to FIG. 4, the vehicle may execute the above-mentioned step 2071 by the APA ECU 403.

Step 2072: determining a first distance that the actual distance is projected to a first direction, the first direction being a tangent direction of the target parking route at the target position point.

For example, referring to FIG. 5, the first direction X is the tangent direction of the target parking route S at the target position point 502, then the first distance L1 that the actual distance D is projected to the first direction X is as shown in FIG. 5.

Optionally, referring to FIG. 4, the vehicle may execute the above-mentioned step 2072 by the APA ECU 403.

Step 2073: determining a second distance that the actual distance is projected to a second direction, the second direction being perpendicular to the first direction.

For example, referring to FIG. 5, the second direction Y is perpendicular to the first direction X, then the second distance L2 that the actual distance is projected to the second direction Y is as shown in FIG. 5.

Optionally, referring to FIG. 4, the vehicle may execute the above-mentioned step 2073 by the APA ECU 403.

Step 2074: determining a heading angle between a current driving direction of the vehicle and the first direction.

For example, referring to FIG. 5, the heading angle Q is an angle between the current driving direction E of the vehicle and the first direction X.

Optionally, referring to FIG. 4, the system of the vehicle further includes: an Electric Power Steering (EPS) 407. The EPS 407 is connected with the core system M, and is mainly configured for feeding back steering wheel angle information of the vehicle to the APA ECU 403 and executing steering wheel rotation. Then the vehicle may execute step 2074 by the EPS 407 to determine the heading angle between the current driving direction of the vehicle and the first direction.

Step 2075: when at least one of the conditions that the first distance being less than or equal to a first preset value, the second distance being less than or equal to a second preset value, and the heading angle being less than or equal to a third preset value is satisfied, sending a prompt message for driving the vehicle to the target position point to the driver of the vehicle.

In the embodiment of the present disclosure, the first preset value may be in a few hundred meters from the target driving route, the second preset value may be 50 cm, and the third preset value may be 5 degrees, which are not specifically limited in the embodiment of the present disclosure. In the current position point, when at least one of the conditions that the first distance being less than or equal to the first preset value, the second distance being less than or equal to the second preset value, and the heading angle being less than or equal to the third preset value is satisfied, the vehicle may display the prompt message for driving the vehicle to the target position point to the driver of the vehicle in the intelligent parking interface. The prompt message may be that: please keep the current low speed and drive straight for 100 meters to reach the target position point. The embodiment of the present disclosure does not limit the specific content of the prompt message.

Optionally, referring to FIG. 4, the vehicle may execute the above-mentioned step 2075 by the APA ECU 403.

Step 208: when the vehicle is driven to the target position point, controlling the vehicle to park according to the target parking route from the target position point.

In the embodiment of the present disclosure, the above-mentioned step 208 may be implemented as follows:

Step 2081: outputting a prompt message configured for indicating to brake at the target position point.

In the embodiment of the present disclosure, the vehicle outputs the prompt message in the intelligent parking interface, and the prompt message is configured for indicating the user to brake at the target position point. The prompt message may be that: please brake to ensure that the vehicle may safely complete automatic parking.

Optionally, referring to FIG. 4, the system of the vehicle further includes: a Transmission Control Unit (TCU) 408. The TCU 408 is connected with the core system M, and the TCU 408 is mainly configured for feeding back current gear information to the APA ECU 403 and completing gear switching. Then, the vehicle may execute step 2081 by the TCU 408, and complete braking after outputting the prompt message for indicating to brake at the target position point.

Step 2082: when the vehicle is driven to the target position point and a vehicle speed is detected to be zero, controlling the vehicle to park according to the target parking route from the target position point.

Wherein, when the vehicle speed is zero, the vehicle may safely complete the automatic parking process.

Optionally, step 2082 may be specifically implemented as follows:

First of all, when the vehicle is driven to the target position point and the vehicle speed is detected to be zero, the vehicle outputs a prompt message for prompting to select a parking mode.

In the embodiment of the present disclosure, when the vehicle is driven to the target position point and the vehicle speed is detected to be zero, the intelligent parking interface of the vehicle may display the prompt message for prompting to select the parking mode. The parking mode may include an in-vehicle playback mode and a remote playback mode.

Then, the vehicle is parked according to target parking route in the selected parking mode.

In the embodiment of the present disclosure, the in-vehicle playback mode refers to that the user monitors a state of the vehicle in the vehicle, and the vehicle may park according to the target parking route. After the parking is completed, the user takes over the vehicle to complete operations such as flameout and locking. The remote playback mode refers to that the user may get off the vehicle, communicate with the vehicle through a Bluetooth key of the vehicle, and control the vehicle to park according to the target parking route. After the parking is completed, the user may remotely control the operations such as flameout and locking.

Optionally, referring to FIG. 4, the system of the vehicle further includes: Passive Entry Passive Start (PEPS) system 409. The PEPS system 409 is connected with the core system M, and the PEPS system 409 is interacted with the BCM 405. The PEPS system 409 is mainly configured for switching management of a power supply system, ignition start control of an engine, anti-theft control and receiving and executing of key instructions. Then, the operations such as flameout and locking may be completed by the PEPS system 409.

Optionally, referring to FIG. 4, the system of the vehicle further includes: a Bluetooth module 410 and a Bluetooth key 411. The Bluetooth key may be a key equipped with a mobile terminal, the Bluetooth module 410 is connected with the core system M, and the Bluetooth key 411 is connected with the Bluetooth module 410. The Bluetooth module 410 is mainly used as an interactive medium for receiving and sending information with the mobile terminal. The Bluetooth key 411 is mainly configured for sending an unlocking instruction or locking instruction, and is further configured for sending a parking function instruction. The Bluetooth key 411 interacts information with the PEPS system 409. Then, when the remote playback mode is selected, the vehicle may be parked through the Bluetooth module 410, the Bluetooth key 411 and the APA ECU 403.

Figure 6:
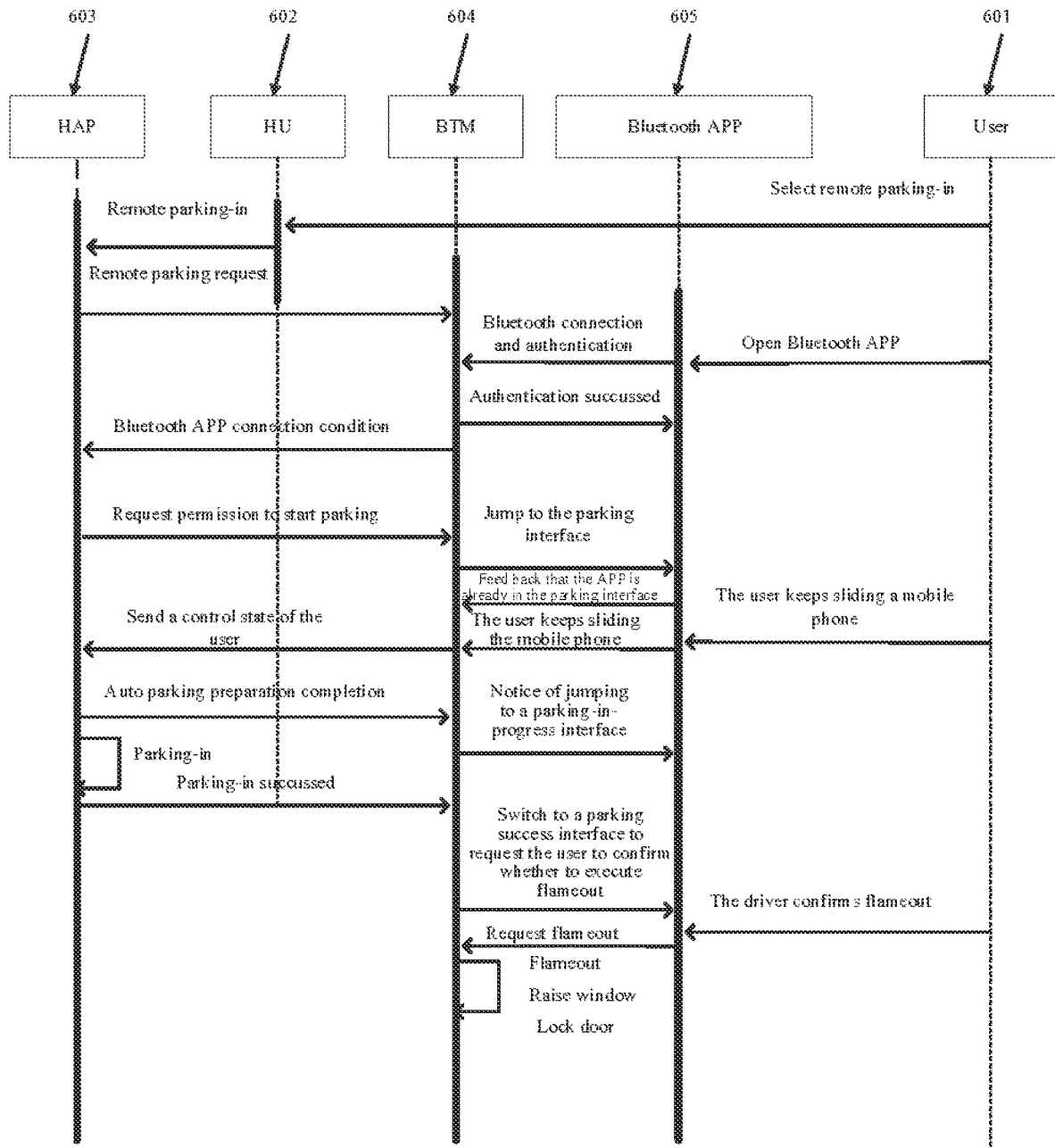
FIG. 6 shows a schematic diagram of signaling transmission for parking according to a remote playback mode provided by the second embodiment of the present disclosure.

For example, FIG. 6 shows a schematic diagram of signaling transmission for parking according to the remote playback mode provided by the second embodiment of the present disclosure. As shown in FIG. 6, when a user 601 selects the remote playback mode, a remote parking-in signaling may be transmitted to a Head Unit (HU) 602 of the vehicle, and a multimedia display screen 602 may transmit the remote parking-in signaling to a Highly Automated Parking (HAP) system 603, and the memory parking system 603 sends a remote parking request to the Bluetooth module (BTM) 604 of the vehicle. The user 601 opens a Bluetooth Application (APP) 605 of a handheld mobile terminal, the Bluetooth APP 605 and the Bluetooth module 604 send connection and authentication requests, the Bluetooth module 604 replies an authentication succeed signaling to the Bluetooth APP 605, and the Bluetooth module 604 sends a connection situation of the Bluetooth APP 605 to the memory parking system 603. The memory parking system 603 sends a signaling requesting approval to start parking to the Bluetooth module 604, the Bluetooth module 604 sends a signaling notifying of jumping to the parking interface to the Bluetooth APP 605, and the Bluetooth APP 605 feeds back a signaling already in the parking interface to the Bluetooth module 604. The user 601 keeps sliding the mobile phone, and the Bluetooth APP 605 sends a signaling that the user continuously slides the mobile phone to the Bluetooth module 604, the Bluetooth module 604 sends a signaling showing a control state of the user to the memory parking system 603, and the memory parking system 603 sends a signaling of automatic parking preparation completion to the Bluetooth module 604. The Bluetooth module 604 sends a notice of jumping to a parking-in-progress interface to the Bluetooth APP 605, and the memory parking system 603 starts parking according to the target parking route. After the parking is completed, the memory parking system 603 sends a parking-in success signaling to the Bluetooth module 604, and the Bluetooth module 604 sends an instruction of being switched to the parking success interface to request the user to confirm whether to execute flameout to the Bluetooth APP 604. The user 601 sends an instruction of confirming flameout to the Bluetooth APP 605, the Bluetooth APP 605 sends a request for turning off the engine to the Bluetooth module 604, and the Bluetooth module 604 controls the vehicle to complete the instructions of flameout, raising the windows and locking the door.

Optionally, referring to FIG. 4, the vehicle may execute the above-mentioned step 2082 by the APA ECU 403.

Step 2083: in the process of controlling the vehicle to park according to the target parking route from the target position point, suspending driving when a man-made emergency operation is detected.

In the embodiment of the present disclosure, the man-made emergency operation may be that the user brakes the vehicle, which is not limited by the embodiment of the present disclosure.

Optionally, referring to FIG. 4, the sensor 401 further includes: a seat belt sensor and a seat pressure sensor, which are mainly configured for feeding back state information of the user in the vehicle to the APA ECU 403, so that the APA ECU 403 may analyze and determine an intention of the user. Therefore, the vehicle may execute the above-mentioned step 2083 by the sensor 401, and suspend driving when the man-made emergency operation is detected.

Step 2084: when receiving a fault-solved instruction, continuously parking according to the target parking route.

For example, when the user puts the vehicle into the P gear, the vehicle should stop driving, and fault information may be displayed on the intelligent display interface 30. For example, the fault information may be that the user puts the vehicle in the P gear which is not capable to continue automatic parking. When the user switches to the Drive (D) gear, that is, when the vehicle receives the fault-solved instruction, the vehicle returns to the position where the driving is suspended to continue parking according to the target parking route.

Optionally, when a fault-unresolved instruction is received, the fault information is displayed.

For example, when the fault is that the user puts the vehicle into the P gear, the displayed fault information may be: the user puts the vehicle in the P gear which is not capable to continue automatic parking.

Optionally, referring to FIG. 4, the vehicle may execute the above-mentioned step 2084 by the APA ECU 403.

Optionally, referring to FIG. 4, the system of the vehicle further includes an Embedded Controller (EC) 412. The EC 412 is connected with the core system M, and the EC 412 is configured for executing a specified independent control function.

In the embodiment of the present disclosure, when the vehicle receives the route learning instruction, shoots the plurality of driving images, and determines the moving tracks of the at least one feature object in the driving environment in the plurality of driving images, respectively, determines the target parking route according to each of the moving tracks, and stores the target parking route, such that the driver may store a plurality of parking routes in the vehicle by route learning, so that the driver may use the automatic parking function in a plurality of scenes. Next, the vehicle determines the target parking route from the at least one pre-stored parking route and determines the target position point closest to the vehicle in the target parking route; sends the prompt message of driving the vehicle to the target position point to the driver of the vehicle when the current position point of the vehicle and the target position point satisfy the proximity matching condition, that is, when the vehicle is in a vicinity of the target parking route, and controls the vehicle to park according to the target parking route from the target position point when the vehicle drives to the target position point. Thus, the driver merely needs to drive the vehicle to the vicinity of the target parking route, and the vehicle may perform intelligent parking. In the embodiment of the present disclosure, the vehicle may complete intelligent parking at a longer distance, without driving the vehicle to a position in front of a parking slot and immediately adjacent to the parking slot for automatic parking, thereby saving the workload and the driving duration of the driver for achieving automatic parking, and improving the convenience of parking.

Third Embodiment

Figure 7:
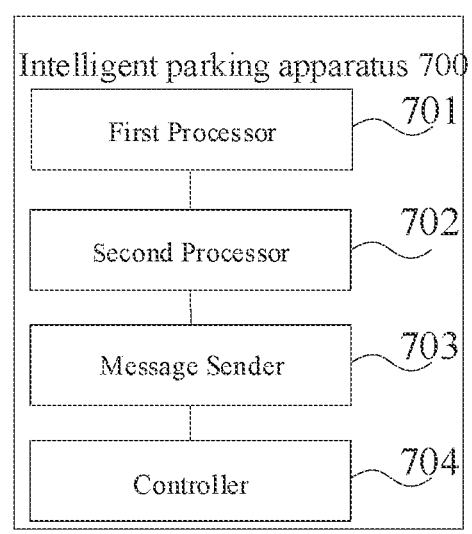
FIG. 7 is a structural block diagram of an intelligent parking apparatus provided by a third embodiment of the present disclosure.

FIG. 7 is a structural block diagram of an intelligent parking apparatus provided by the third embodiment of the present disclosure. The intelligent parking apparatus 700 includes:
- a first processor 701 configured for determining a target parking route from at least one pre-stored parking route;
- a second processor 702 configured for determining a target position point in the target parking route closest to a vehicle;
- a message sender 703 configured for sending a prompt message for driving the vehicle to the target position point to a driver of the vehicle when a current position point of the vehicle and the target position point satisfy a proximity matching condition; and
- a controller 704 configured for, when the vehicle drives to the target position point, controlling the vehicle to park according to the target parking route from the target position point.

The specific implementations of each module in the embodiments of the present disclosure is introduced in detail at the method aspect, and will not be repeated here.

In the embodiment of the present disclosure, the vehicle determines the target parking route from the at least one pre-stored parking route via the first processor and determines the target position point closest to the vehicle in the target parking route via the second processor; and then, sends the prompt message of driving the vehicle to the target position point to the driver of the vehicle via the message sender when the current position point of the vehicle and the target position point satisfy the proximity matching condition, that is, when the vehicle is in a vicinity of the target parking route, and finally controls the vehicle to park according to the target parking route from the target position point via the controller when the vehicle drives to the target position point. Thus, the driver merely needs to drive the vehicle to the vicinity of the target parking route, and the vehicle may perform intelligent parking. In the embodiment of the present disclosure, the vehicle may complete intelligent parking at a longer distance, without driving the vehicle to a position in front of a parking slot and immediately adjacent to the parking slot for automatic parking, thereby saving the workload and the driving duration of the driver for achieving automatic parking, and improving the convenience of parking.

Fourth Embodiment

Figure 8:
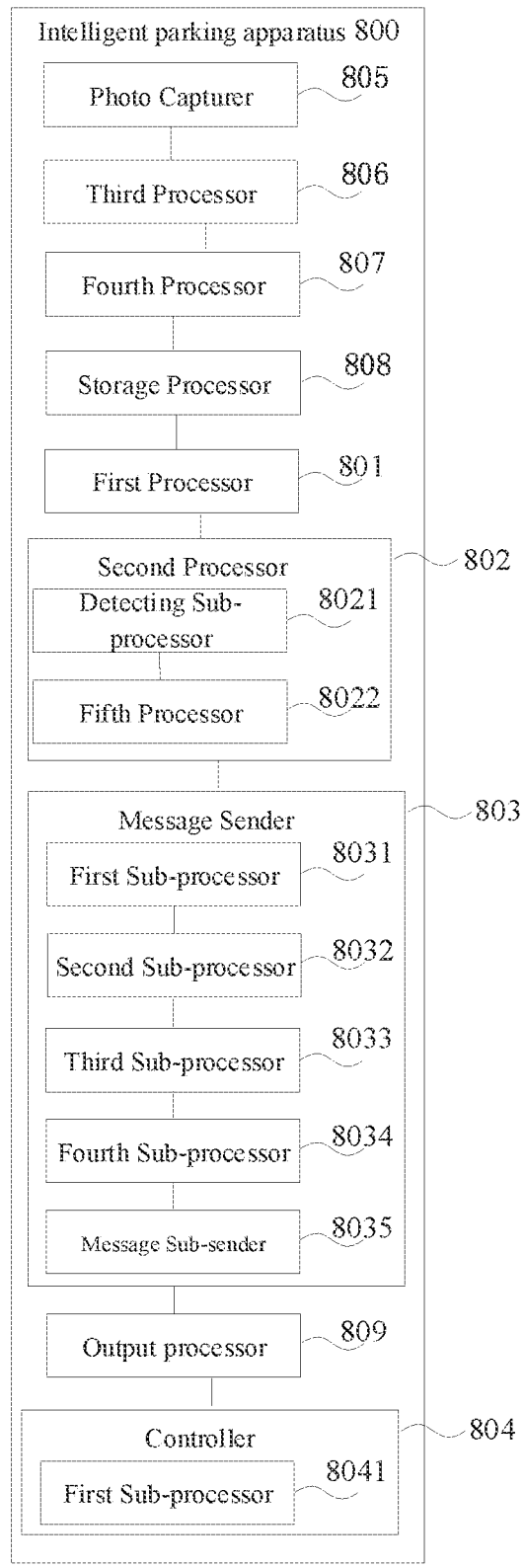
FIG. 8 is a structural block diagram of an intelligent parking apparatus provided by a fourth embodiment of the present disclosure.

FIG. 8 is a structural block diagram of an intelligent parking apparatus provided by the fourth embodiment of the present disclosure. The intelligent parking apparatus 800 includes:
- a first processor 801 configured for determining a target parking route from at least one pre-stored parking route;
- a second processor 802 configured for determining a target position point in the target parking route closest to a vehicle;
- a message sender 803 configured for sending a prompt message for driving the vehicle to the target position point to a driver of the vehicle when a current position point of the vehicle and the target position point satisfy a proximity matching condition; and
- a controller 804 configured for controlling the vehicle to park according to the target parking route from the target position point when the vehicle drives to the target position point.

Optionally, referring to FIG. 8, the intelligent parking apparatus 800 further includes:
- a photo capturer 805 configured for shooting a plurality of driving images when receiving a route learning instruction;
- a third processor 806 configured for determining moving tracks of at least one feature object in a driving environment in the plurality of driving images, respectively;
- a fourth processor 807 configured for determining the target parking route according to each moving track; and
- a storage processor 808 configured for storing the target parking route.

Optionally, referring to FIG. 8, the message sender 803 includes:

a first determining sub-processor 8031 configured for determining an actual distance between the current position point of the vehicle and the target position point;

a second determining sub-processor 8032 configured for determining a first distance that the actual distance is projected to a first direction, the first direction being a tangent direction of the target parking route at the target position point;

a third determining sub-processor 8033 configured for determining a second distance that the actual distance is projected to a second direction, the second direction being perpendicular to the first direction;

a fourth determining sub-processor 8034 configured for determining a heading angle between a current driving direction of the vehicle and the first direction; and a message sub-sender 8035 configured for, when at least one of the conditions that the first distance being less than or equal to a first preset value, the second distance being less than or equal to a second preset value, and the heading angle being less than or equal to a third preset value is satisfied, sending a prompt message for driving the vehicle to the target position point to the driver of the vehicle.

Optionally, referring to FIG. 8, the intelligent parking apparatus 800 further includes:

an output processor 809 configured for outputting a prompt message for indicating to brake at the target position point; and the controller 804 includes:

a first sub-controller 8041 configured for controlling the vehicle to park according to the target parking route from the target position point when the vehicle is driven to the target position point and a vehicle speed is detected to be zero.

Optionally, referring to FIG. 8, the second processor 802 includes:

a detecting sub-processor 8021 configured for detecting a vehicle parameter, the vehicle parameter includes at least one of a tire pressure, a door state and a rearview mirror state; and a fifth determining sub-processor 8022 configured for determining the target position point in the target parking route closest to the vehicle when the vehicle parameter satisfies a preset condition.

The specific implementations of each module in the embodiments of the present disclosure are introduced in detail at the method aspect, and will not be repeated here.

In the embodiment of the present disclosure, when receiving the route learning instruction, the vehicle shoots the plurality of driving images via the photo capturer, and determines the moving tracks of the at least one feature object in the driving environment in the plurality of driving images respectively via the third processor, determines the target parking route according to each moving track via the fourth processor, and stores the target parking route via the storage processor, such that the driver may store a plurality of parking routes in the vehicle by route learning, so that the driver may use the automatic parking function in a plurality of scenes. Next, the vehicle determines the target parking route from the at least one pre-stored parking route via the first processor and determines the target position point closest to the vehicle in the target parking route via the second processor; and then, sends the prompt message of driving the vehicle to the target position point to the driver of the vehicle via the message sender when the current position point of the vehicle and the target position point satisfy the proximity matching condition, that is, when the vehicle is in a vicinity of the target parking route, and finally controls the vehicle to park according to the target parking route from the target position point via the controller when the vehicle drives to the target position point. Thus, the driver merely needs to drive the vehicle to the vicinity of the target parking route, and the vehicle may perform intelligent parking. In the embodiment of the present disclosure, the vehicle may complete intelligent parking at a longer distance, without driving the vehicle to a position in front of a parking slot and immediately adjacent to the parking slot for automatic parking, thereby saving the workload and the driving duration of the driver for achieving automatic parking, and improving the convenience of parking.

Those described above are merely preferred embodiments of the present disclosure, but are not intended to limit the present disclosure. Any modifications and equivalent substitutions made without departing from the principle of the present disclosure shall all fall within the protection scope of the present disclosure.

The above-described apparatus embodiments are merely illustrative, wherein the units that are described as separate components may or may not be physically separate, and the components that are displayed as units may or may not be physical units; in other words, they may be located at the same one location, and may also be distributed to a plurality of network units. Part or all of the modules may be selected according to the actual demands to realize the purposes of the solutions of the embodiments. A person skilled in the art may understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the calculating and processing device according to the embodiments of the present disclosure may be implemented by using a microprocessor or a digital signal processor (DSP) in practice. The present disclosure may also be implemented as device or apparatus programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 9:
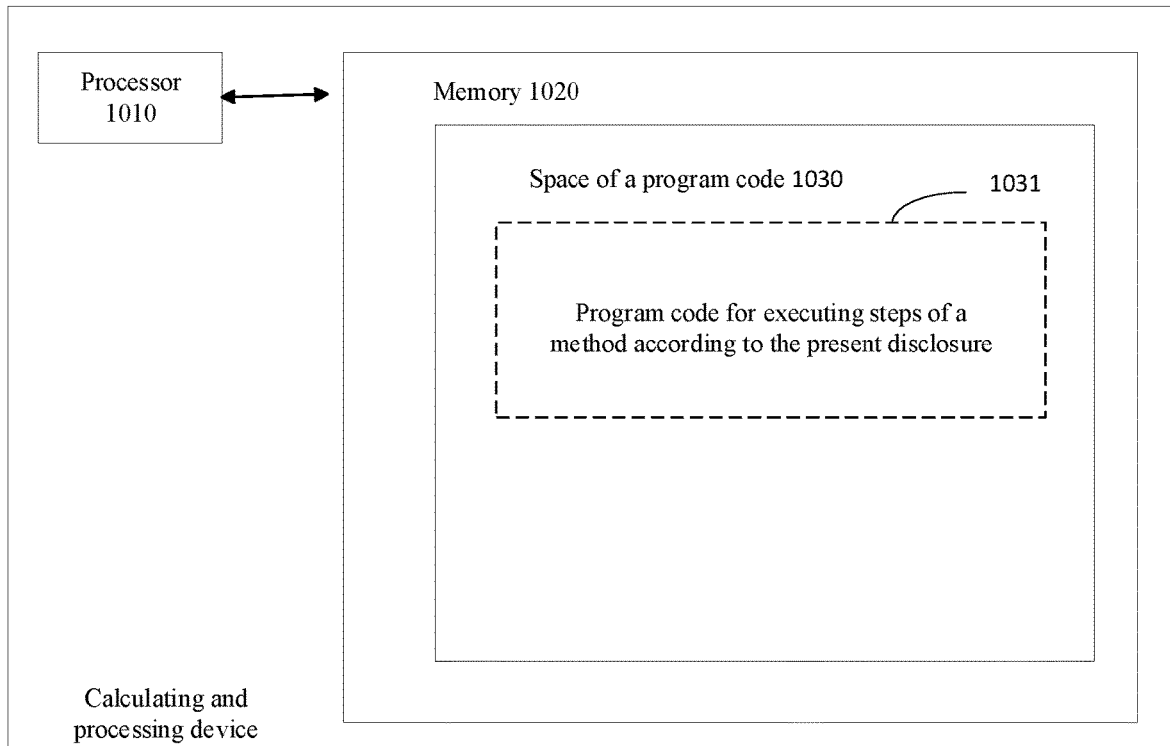
FIG. 9 schematically shows a block diagram of a calculating and processing device for executing the method according to the present disclosure.
Figure 10:
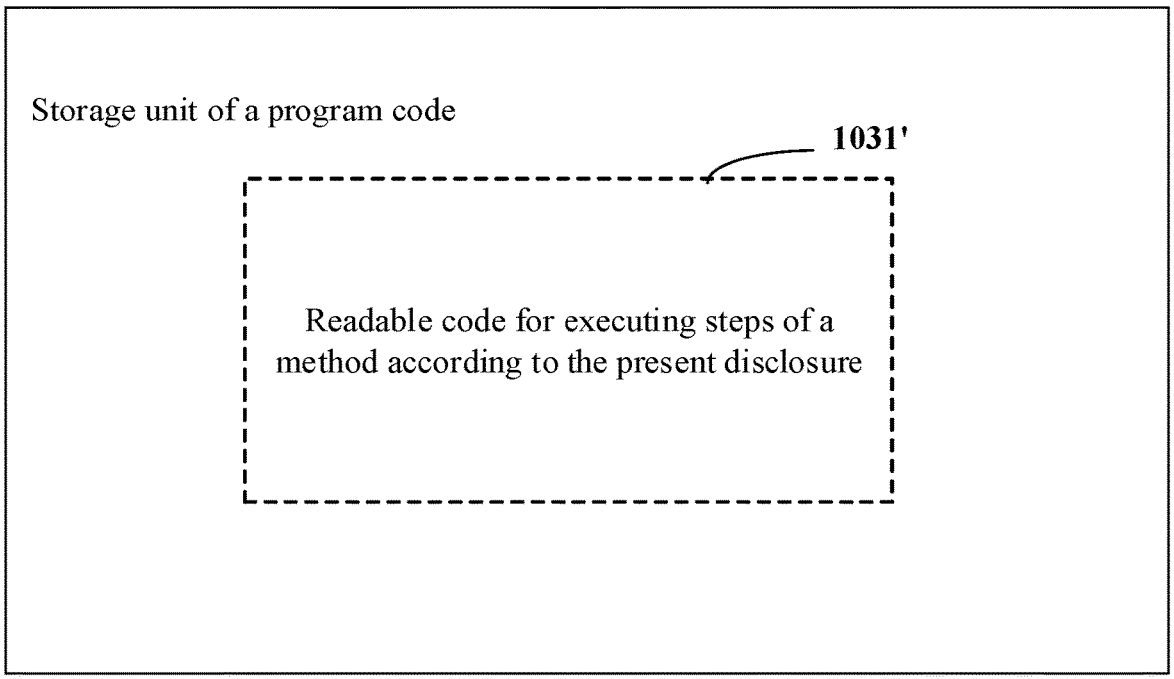
FIG. 10 schematically shows a storage unit for holding or carrying a program code for implementing the method according to the present disclosure.

For example, FIG. 9 shows a calculating and processing device that may implement the method according to the present disclosure. The calculating and processing device traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has a storage space 1030 of a program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as hard disk, compact disk (CD), memory card or floppy disk. Such computer program products are usually portable or fixed storage units as shown in FIG. 10. The storage unit may have storage segments or storage spaces with similar arrangement to the memory 1020 of the calculating and processing device in FIG. 9. The program codes may for example be compressed in a suitable form. Generally, the storage unit contains a computer-readable code 1031', which may be read by a processor like 1010. When those codes are executed by the calculating and processing device, the codes cause the calculating and processing device to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it may be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those apparatuses may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail by referring to the above embodiments, a person skilled in the art should understand that he may still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. An intelligent parking method, wherein the intelligent parking method is applied to a vehicle, and the method comprises:
    by using a first processor of the vehicle, determining a target parking route from at least one pre-stored parking route;
    by using a second processor of the vehicle, determining a target position point in the target parking route closest to the vehicle;
    by using a message sender of the vehicle, sending a prompt message for driving the vehicle to the target position point to be displayed to the driver of the vehicle when a current position point of the vehicle and the target position point satisfy a proximity matching condition; and
    by using a controller, when the vehicle is driven to the target position point, controlling the vehicle to park automatically according to the target parking route from the target position point,
    wherein before the step of determining the target position point route by the first processor, the method further comprises:
    by using a photo capturer of the vehicle, shooting a plurality of driving images when receiving a route learning instruction;
    by using a third processor of the vehicle, determining moving tracks of at least one feature object in a driving environment in the plurality of driving images, respectively;
    by using a fourth processor of the vehicle, determining the target parking route according to each of the moving tracks; and
    by using a storage processor of the vehicle, storing the target parking route.

2. The method according to claim 1, wherein determining the moving tracks of at least one feature object by the third processor, comprises:
    searching pixels with feature points in the plurality of driving images, and extracting key points in the plurality of driving images;
    calculating descriptors of the feature points according to position information of the key points;
    matching descriptors of at least one feature point in the driving environment in the plurality of driving images, respectively, according to the descriptors of the feature points; and
    recording position information of the successfully matched descriptors, and connecting the position information according to a time sequence to obtain moving tracks of the at least one feature point in the plurality of driving images, respectively.

3. The method according to claim 1, wherein determining the target position point from the at least one pre-stored parking route by the first processor comprises:
    displaying an intelligent parking interface, the intelligent parking interface comprising a starting position photo and an ending position photo of each parking route;
    receiving a parking instruction in the intelligent parking interface; and
    determining the target parking route from the at least one pre-stored parking route.

4. The method according to claim 1, wherein the step of sending the prompt message for driving the vehicle to the target position point to be displayed to the driver when the current position point of the vehicle and the target position point satisfy the proximity matching condition by the message sender, comprises:
    by using a first determining sub-processor, determining an actual distance between the current position point of the vehicle and the target position point;
    by using a second determining sub-processor, determining a first distance that the actual distance is projected to a first direction, the first direction being a tangent direction of the target parking route at the target position point;
    by using a third determining sub-processor, determining a second distance that the actual distance is projected to a second direction, the second direction being perpendicular to the first direction;
    by using a fourth determining sub-processor, determining a heading angle between a current driving direction of the vehicle and the first direction; and by using a message sub-sender, when at least one of the first distance being less than or equal to a first preset value, the second distance being less than or equal to a second preset value, and the heading angle being less than or equal to a third preset value is satisfied, sending a prompt message for driving the vehicle to the target position point to be displayed to the driver.

5. The method according to claim 1, wherein before the step of controlling the vehicle to park automatically according to the target parking route from the target position point by the controller, the method further comprises:

by using an output processor, outputting a prompt message for indicating to brake at the target position point to be displayed to the driver; and the step of, when the vehicle drives to the target position point, controlling the vehicle to park automatically according to the target parking route from the target position point, comprises:

by using a first sub-controller, when the vehicle drives to the target position point and a vehicle speed is detected to be zero, controlling the vehicle to park automatically according to the target parking route from the target position point.

6. The method according to claim 1, wherein the step of determining the target position point in the target parking route closest to the vehicle by the second processor, comprises:

by using a detecting sub-processor, detecting a vehicle parameter, the vehicle parameter comprising at least one of a tire pressure, a door state and a rearview mirror state; and by using a fifth determining sub-processor, when the vehicle parameter satisfies a preset condition, determining the target position point in the target parking route closest to the vehicle.

7. An intelligent parking apparatus, comprising:

a first processor of a vehicle configured for determining a target parking route from at least one pre-stored parking route;

a second processor of the vehicle configured for determining a target position point in the target parking route closest to a vehicle;

a message sender of the vehicle configured for sending a prompt message for driving the vehicle to the target position point to be displayed to the driver of the vehicle when a current position point of the vehicle and the target position point satisfy a proximity matching condition; and a controller of the vehicle configured for controlling the vehicle to park automatically according to the target parking route from the target position point when the vehicle is driven to the target position point, a photo capturer of the vehicle configured for shooting a plurality of driving images when receiving a route learning instruction;

a third processor of the vehicle configured for determining moving tracks of at least one feature object in a driving environment in the plurality of driving images, respectively;

a fourth processor of the vehicle configured for determining the target parking route according to each moving track; and a storage processor of the vehicle configured for storing the target parking route.

8. The apparatus according to claim 7, wherein the message sender, comprises:

a first determining sub-processor configured for determining an actual distance between the current position point of the vehicle and the target position point;

a second determining sub-processor configured for determining a first distance that the actual distance is projected to a first direction, the first direction being a tangent direction of the target parking route at the target position point;

a third determining sub-processor configured for determining a second distance that the actual distance is projected to a second direction, the second direction being perpendicular to the first direction;

a fourth determining sub-processor configured for determining a heading angle between a current driving direction of the vehicle and the first direction; and a message sub-sender configured for, when at least one of the first distance being less than or equal to a first preset value, the second distance being less than or equal to a second preset value, and the heading angle being less than or equal to a third preset value is satisfied, sending a prompt message for driving the vehicle to the target position point to be displayed to the driver.

9. The apparatus according to claim 7, further comprising:

an output processor of the vehicle configured for outputting a prompt message for indicating to brake at the target position point to be displayed to the driver; and the controller comprises:

a first sub-controller configured for controlling the vehicle to park according to the target parking route from the target position point when the vehicle is driven to the target position point and a vehicle speed is detected to be zero.

10. The apparatus according to claim 7, wherein the second processor comprises:

a detecting sub-processor configured for detecting a vehicle parameter, the vehicle parameter comprising at least one of a tire pressure, a door state and a rearview mirror state; and a fifth determining sub-processor configured for, when the vehicle parameter satisfies a preset condition, determining the target position point in the target parking route closest to the vehicle.

11. The apparatus according to claim 7, wherein the apparatus further comprises:

a memory in which a computer-readable code is stored; and the memory is executed by all or any one of the first processor, the second processor, the message sender and/or the controller.

12. A non-transitory computer-readable medium, wherein the computer-readable medium stores computer program for signal measuring executable by an electronic device, the method comprises:

by using a first processor of a vehicle, determining a target parking route from at least one pre-stored parking route;

by using a second processor of the vehicle, determining a target position point in the target parking route closest to the vehicle;

by using a message sender of the vehicle, sending a prompt message for driving the vehicle to the target position point to be displayed to the driver of the vehicle when a current position point of the vehicle and the target position point satisfy a proximity matching condition; and by using a controller, when the vehicle is driven to the target position point, controlling the vehicle to park automatically according to the target parking route from the target position point, wherein before the step of determining the target position point route by the first processor, the method further comprises:

by using a photo capturer of the vehicle, shooting a plurality of driving images when receiving a route learning instruction;

by using a third processor of the vehicle, determining moving tracks of at least one feature object in a driving environment in the plurality of driving images, respectively;

by using a fourth processor of the vehicle, determining the target parking route according to each of the moving tracks; and by using a storage processor of the vehicle, storing the target parking route.

13. The apparatus according to claim 7, wherein the apparatus further comprises:

a memory in which a computer-readable code is stored; and the memory is executed by all or any one of the photo capturer, the third processor, the fourth determining sub-processor and the storage processor.

\* \* \* \* \*